June 30, 1964  E. R. McCLELLAND ETAL  3,139,172
PEAR ORIENTING MACHINE
Filed July 23, 1962  2 Sheets-Sheet 1
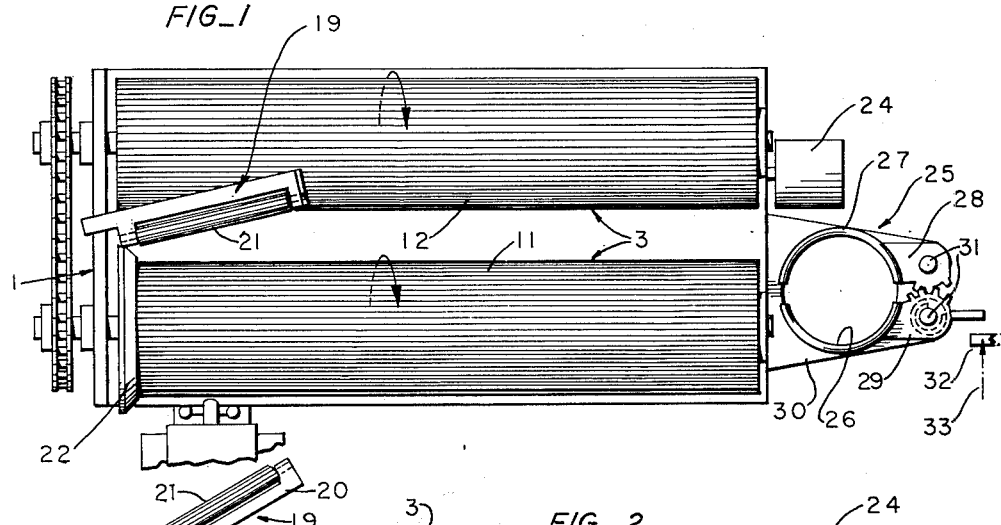
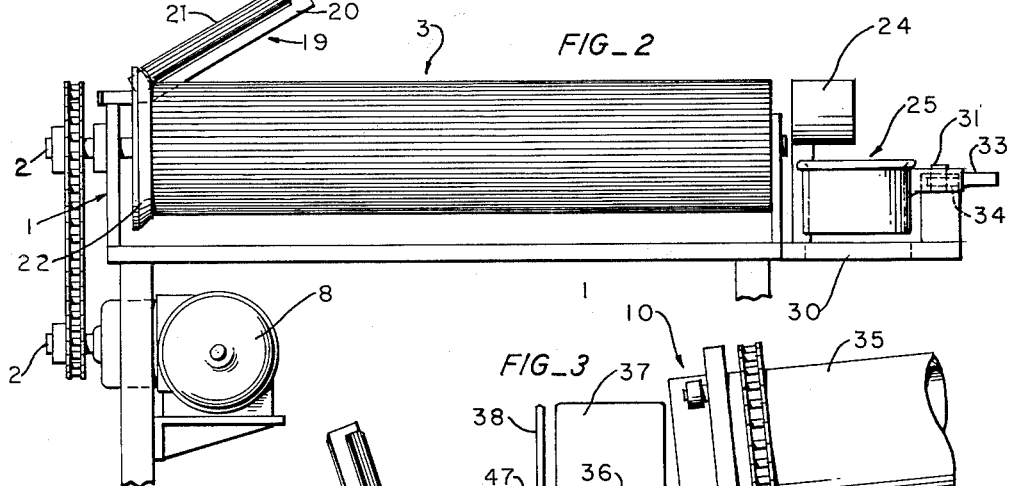
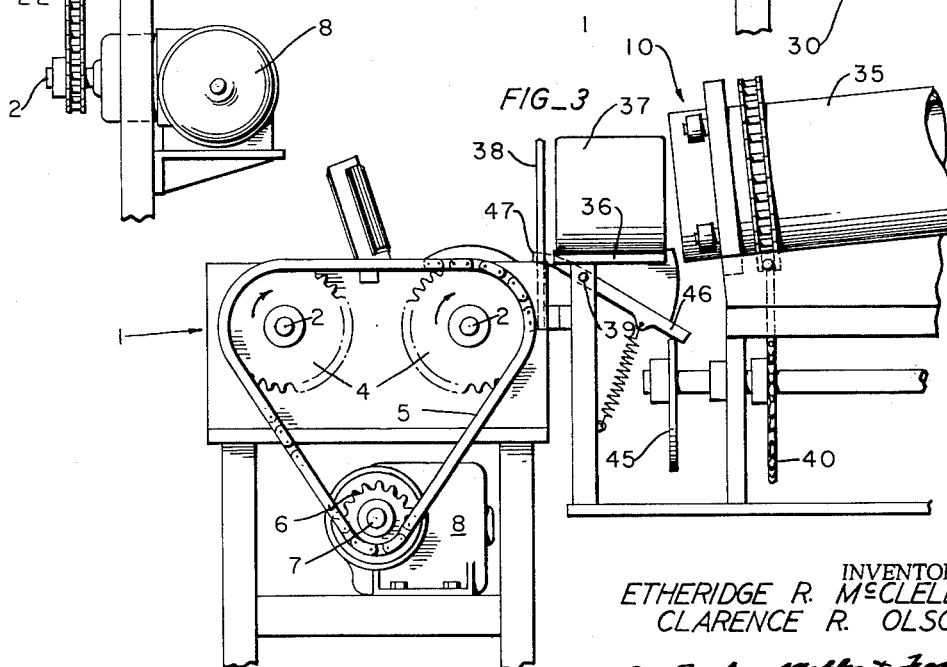
INVENTORS
ETHERIDGE R. McCLELLAND
CLARENCE R. OLSON
BY Bryken, Mohler & Foster
ATTORNEYS

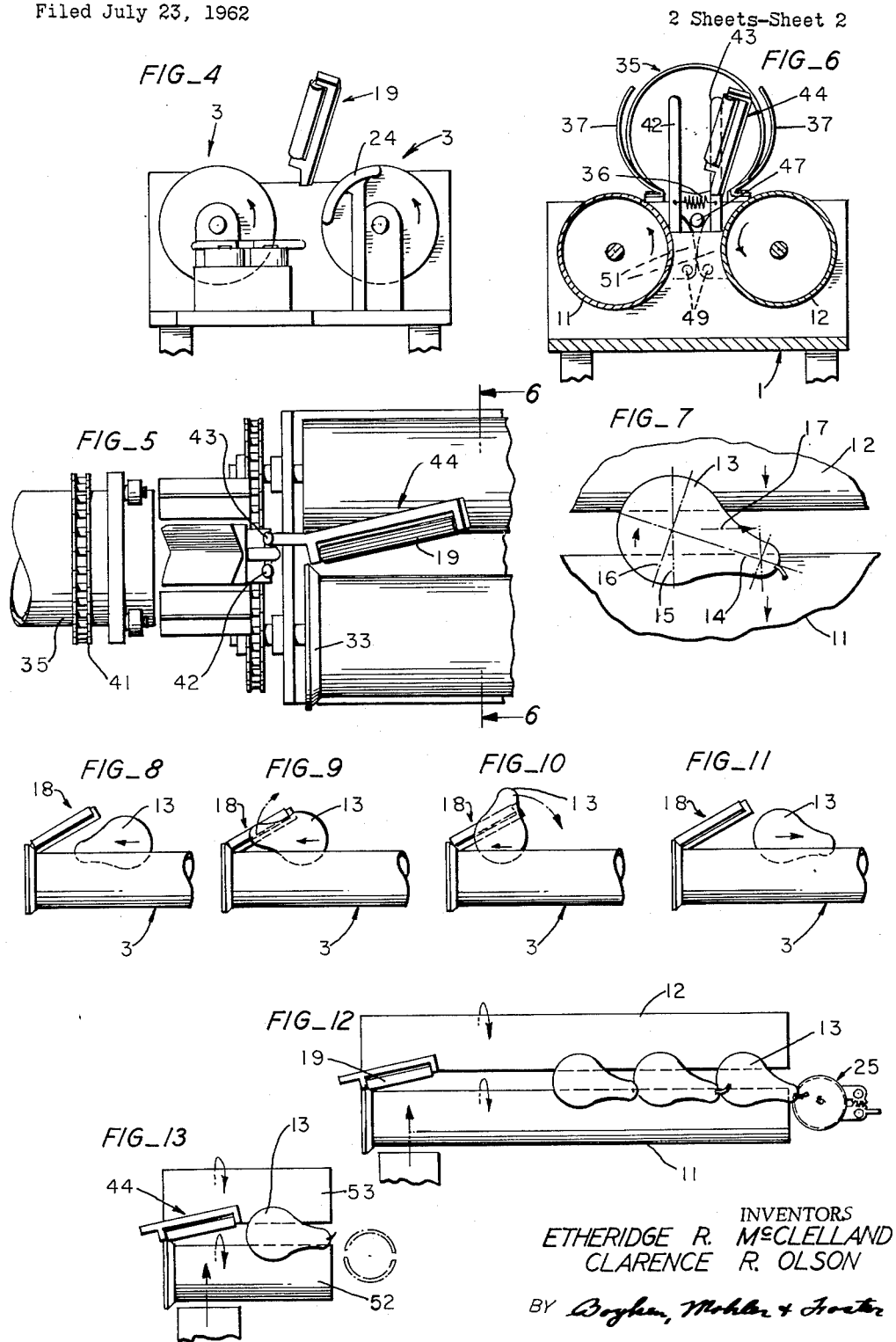

United States Patent Office 3,139,172
Patented June 30, 1964

3,139,172
PEAR ORIENTING MACHINE
Etheridge R. McClelland, Hayward, and Clarence R. Olson, Castro Valley, Calif., assignors to Filper Corporation, San Ramon, Calif., a corporation of California
Filed July 23, 1962, Ser. No. 211,492
2 Claims. (Cl. 198—33)

This invention relates to a pear orienting machine and to a method of orienting pears.

One of the objects of the invention is the provision of a machine that is adapted to receive pears, indiscriminately arranged with respect to their blossom stem axes, and to automatically orient such pears so that their stem ends will all face in the same direction with said pears in files.

The words "pear shaped," describe the shape of any fruit or vegetable having a main globular body with a neck of reduced diameter projecting from one side of said main body. This invention is adapted to automatically orient pear shaped fruit and vegetables so that such reduced diameter necks will face in substantially the same direction. Thus, in the case of pears, the stem ends of the pears will be directed in substantially the same direction by the present method and apparatus.

The orienting of pears with respect to their stem blossom axes is quite important inasmuch as the machines for coring and pearing the pears require them to be delivered thereto in a predetermined position.

One of the objects of the present invention is the provision of a pear orienting machine that is adapted to orient pears so their stem ends will face in the same direction, and to accomplish this step without injury to the pears, and to deliver said pears to either transfer devices or to other apparatus, with the stem ends of the pears facing one general direction.

An additional object of the invention is the provision of a pear orienting machine that is adapted to receive and deliver pears in a path that is in substantially continuation of a path in which said pears are moved in single file from a feeding mechanism to the orienting machine.

A still further object of the invention is the provision of an improved method of orienting pears.

An additional object is the provision of a pear aligning machine in combination with a feeder from which pears are delivered one at a time onto the orienting machine, and which feeder includes means cooperatively related to the orienting machine for orienting the pears.

Other objects and advantages will appear in the description and in the drawings.

In the drawings,

FIG. 1 is a top plan view of the pear orienting machine.

FIG. 2 is a side elevational view of the machine of FIG. 1.

FIG. 3 is an end view of the machine of FIGS. 1 and 2 including the delivery end of a feeder that is adapted to feed pears one at a time. The end of the pear orienting machine shown in this figure is the pear receiving end.

FIG. 4 is an end elevational view of the pear discharge end of the pear orienting machine of FIGS. 1–3.

FIG. 5 is a top plan view of the pear receiving end of a pear orienting machine in line with the discharge end of a feeder of generally the same type shown in FIG. 3, but which feeder and pear orienting machine are modified to provide for "in-line" feeding of pears to the pear orienting machine.

FIG. 6 is a cross sectional view taken along line 6—6 of FIG. 5.

FIG. 7 is a top plan view of a pear on the pear orienting machine illustrating the movement of the pear relative to its blossom stem axis.

FIGS. 8, 9, 10, 11 are reduced size fragmentary side elevaional views showing the movement of a pear during orientation thereof.

FIG. 12 is a top plan view showing a plurality of oriented pears moving to a discharge point for discharge from the machine in oriented position.

FIG. 13 is a view similar to that of FIG. 12 but showing a short single pear orienting machine for orienting and delivering one pear at a time in oriented position.

In detail, the machine illustrated in FIGS. 1–3 comprises a frame, generally designated 1 (FIG. 2), provided with bearings rotatably supporting a pair of parallel, horizontally disposed shafts 2 carrying rollers that are generally designated 3 coaxial and rigid therewith.

Rollers 3 carry sprocket wheels 4 (FIG. 3) at one of their ends, and a sprocket chain 5 extends over said sprocket wheels and over the sprocket wheel 6 on a driven shaft 7 in driving connection with a motor 8 for rotating said shafts 2, and consequently said rollers 3, in the same direction.

The left hand ends of the rollers 3 as seen in FIGS. 1, 2 will be called the "receiving end" of the machine, inasmuch as the pears are adapted to be fed onto the rollers at said end, one at a time, from a feeder generally designated 10 (FIG. 3), which feeder may be of the type shown and described in detail in copending United States application of George E. Kilner and Leonard McGihon, Serial No. 179,552, filed March 14, 1962.

In the arrangement shown in FIGS. 1–3 the rollers 3 are rotated clockwise as viewed from the receiving end (FIG. 3). The movement would be counterclockwise as viewed from the discharge end (FIG. 4).

With the rollers 3 rotating in the same direction, as above described, it will be apparent that the adjacent surfaces of the rollers will move oppositely, one surface of which, on the roller specifically designated 11, moving upwardly and away from the other, while the others on the roller specifically designated 12, will move downwardly and away from the roller 11 at the lower side of roller 12.

Rollers 11, 12 of each pair are spaced apart a substantial distance, but preferably substantially less than the diameters of the rollers, which diameters are the same and are uniform from end to end of the rollers. Also the outer surfaces of the rollers are preferably fluted or milled with the grooves or milling longitudinally thereof to effect rotation of the pears positioned on the rollers, substantially free from slippage thereof but without injury to the pears.

By the above arrangement, upon a pear, such as generally designated 13 in FIGS. 8–13, being supported on the pair of rollers 3, the pear will always travel with the stem end leading, and with the stem end against whichever roller is moving upwardly at the surface that faces the adjacent roller. In this instance, the stem end of the pear will engage the roller 11, irrespective of whether the pear faces the receiving ends of the rollers or their discharge ends, since the roller 11 is the one that has the upwardly moving surface. Thus the roller 11 can be designated as the "pulling" roller while roller 12 is the "pushing" roller, it being roller 11 that draws the reduced diameter end of the pear away from roller 12 while roller 12 supplies the drive that engages the main body of the pear and drives the pear longitudinally of the rollers 11, 12 with the smaller diameter end leading.

FIG. 8 shows a pear 13 that has been positioned on a pair of rollers 11, 12, with the stem end directed toward the receiving ends of the rollers, while the pear 13 in FIG. 7 has its smaller diameter end directed toward the discharge end of the rollers.

FIG. 7 may be used to illustrate the position of the pear relative to the rollers, irrespective of the direction in which the stem end faces relative to the receiving and discharge ends of the rollers.

The pear 13 may be initially positioned crosswise of the rollers or with its axis 14 extending, at the stem end of the pear toward roller 12, or the axis 14 may be wholly in a vertical plane, or in any other position than is shown in FIGS. 7, 12, 13.

Assuming the rollers are rotating in the directions indicated in FIGS. 7, 12, 13 at the time a pear is deposited thereon, as above described, it will commence to move to a position in which the smaller diameter stem end will be directed angularly toward the roller 11. If the stem end portion should engage roller 12, it may be moved downwardly until it engages roller 11, and thereafter the stem end portion will remain adjacent to roller 11 with the axis 14 of the pear at an angle to the longitudinal axis of the roller, as seen in FIG. 7.

The points of contact between the large diameter body portion of the pear and rollers 11, 12 will be disposed in a generally vertically disposed plane 15 that is at approximately the same angle relative to plane 16 that is perpendicular to axis 14 at the center of said body portion as the angle of incidence between axis 14 and a vertical plane in which the axis of roller 11 is disposed. Thus upon rotation of the rollers, the pear will advance along the rollers with the stem end leading, and each of the points on the outer periphery of the pear in plane 16 will move in a helical path about the longitudinal axis 17 of the path of travel of the pear.

In the event a pear advancing on the rollers 11, 12 engages a stationary object at a point over the pear and offset to the side of axis 14 that is adjacent to roller 12, the stem end of the pear will swing upwardly and completely over to face in the opposite direction, and the pear will then move along the rollers in a direction opposite to its original direction, but with the smaller diameter leading end still directed generally toward roller 11. The roller 12 will cooperate with roller 11 to drive the stem end of the pear upwardly and over to the reverse position as described.

Referring to FIGS. 1, 2 which show the receiving ends of the rollers, a pear engaging guide and turning device is generally designated 19, and which device comprises an elongated roller support or bracket 20 rigidly secured at one end to a portion of frame 1 that is at the receiving ends of the rollers.

This bracket arm 20 extends slantingly upwardly from its point of securement to frame 1 in a direction generally toward roller 12 but above the latter. An elongated roller 21 alongside arm 20 is rotatably supported at its ends between projections on said arm at its ends and which projections extend to one of the sides of said arm (FIG. 1). This roller 21 may be longitudinally scored or milled on its cylindrical outer surface, and the roller is the element of the pear engaging device 19 that preferably engages the generally upwardly directed surface of a pear that is advancing on rollers 11, 12 toward the receiving end of said rollers. A stationary rod having a pear engaging surface curved in cross sectional contour would also function, if in the position of roller 21, to effect a reversal in the direction of movement of a pear, and if such surface were coated with a layer of plastic, such as the one known to the trade as Teflon, it would present an antifriction pear engaging surface against which the pear would freely slide.

In using the word "stationary" with respect to the device 19, the word is intended to mean that the device is rigid with respect to its position as related to rollers 11, 12.

In actual practice, if more than one pear is on rollers 11, 12 with their stem ends directed toward the feed end of the rollers or if pears are on the rollers with their stem ends facing each other, all of the pears will ultimately adjust themselves so that their stem ends face the discharge end, as seen in FIG. 12. This is caused by blocking the movement of the pears past the device 19, and a radially outwardly projecting flange 22 on the receiving end of roller 11 will cooperate with the device 19 to prevent movement of the pears off the receiving ends of the rollers. It may be noted at this point that adjacent pears that may be moving toward each other on rollers 11, 12 will adjust themselves to each other until one reverses its direction but since the device 19 will not only positively reverse a pear at the receiving ends of the rollers but will form a stop against movement of the pear past said device, an adjacent pear to the one that is so stopped will invariably be reversed, if its stem end is directed toward the receiving end of the pair of rollers 11, 12.

The side of the flange 22 that faces toward the discharge end of roller 11 is bevelled, as indicated in the drawings, so as not to injure any of the pears that may engage said flange.

Adjacent to the discharge end of roller 12, and positioned axially outwardly thereof, is a deflector, or guide member 24. This member 24 is stationarily secured to frame 1, and it has a convex cylindrical surface that is generally in axial extension of the cylindrical surface of roller 12 at the upper side of the latter and at the side of the roller extending downwardly to the same side of roller 12 as the side that faces roller 11 (FIG. 4).

Deflector 24 is adapted to insure that pears moving off the discharge ends of the pair of rollers 11, 12 will drop into an annular receiving holder, generally designated 25 with the stem end of each pair projecting downwardly.

The receiving holder 25, illustrated in FIGS. 1, 2 may be a pair of semi-cylindrical members 26, 27 having their concave sides facing each other, horizontally, so as to define a cylindrical holder having a vertical axis.

The holder 25, as a unit, is positioned axially outwardly of the discharge end of roller 11, but slightly offset toward the axis of roller 12. The upper level of the holder is approximately at or slightly below the axis of roller 11.

With the holder in the position above described, it will be approximately below the smaller diameter end of each pear that moves off the discharge ends of rollers 11, 12. As soon as each pear passes off the discharge ends of rollers 11, 12 said smaller diameter ends will tilt downwardly into the open upper ends of the holders and thereafter the body of each pear will follow to be supported on the upper edge or rim of each holder with its axis vertical and coaxial with the vertical axis of the holder. The guide or deflector 24 will insure against any possibility of the pear falling out of the holder to the side of roller 12, and it will also function to prevent possible "cocking" of the pears in holder 25.

The rollers 11, 12 in combination with the device 19 will, of course, orient the pears to the positions shown in FIG. 12. It is possible that other receiving means than is shown, after the pears are oriented, may be used, but the means disclosed by holder 25 is a practical means.

The halves 26, 27 of holder 25 may be provided with a pair of laterally projecting arms 28, 29 that are pivotally supported on an outwardly projecting portion 30 of frame 1 by a pair of vertical pivots 31. The adjacent sides of arms 28, 29 at their pivotally supported ends are formed with rows of intermeshing gear teeth, each row being concentric with the pivot adjacent thereto. The arm 29 has a projection 31 that is adapted to be engaged by any suitable element 32 associated with a transfer device, pear corer, peeler, or other processing machine moving in the direction of arrow 33 (FIG. 1) with the result of swinging the halves 26, 27 open to release the pear that is supported thereby. A torsion spring 34 within arm 29 may yieldably hold the halves 26, 27 together.

Referring to FIG. 3 the apparatus generally designated 10 and which substantially corresponds to the discharge end of the feeder shown in the aforesaid copending application, includes a rotating inclined cylinder 35 through which the pears are moved in a file so that one pear at a time will be discharged out of its lower open end onto a tiltable horizontal platform 36 that has a pair of spaced opposed side walls 37 to prevent the pear from rolling off the platform.

An end gate 38, operating in timed relation to the tilting of the platform 36 releases each pear on platform 36 for rolling out the feed end of the pair of rollers 11, 12 upon the platform 36 being tilted about pivot 39.

FIG. 3 is shown in order to illustrate a side feed arrangement, which may be used, but, as is apparent, where it is desirable to use a plurality of sets of rollers 11, 12, they cannot be supported in a compact arrangement in a row. It must be considered that pears are relatively delicate and are easily bruised, hence they should not be dropped any substantial distance onto a hard or relatively hard surface. In view of the horizontal, parallel positions of the rollers 11, 12 of the present orienting apparatus, the feeder shown and described in the aforesaid copending application is particularly adapted to cooperate with said orienting machine to enable a plurality of sets of rollers 11, 12, in a row, to be assembled in a compact machine with a feeder for each orienting machine.

The same numbers will be used for the feeder as described for FIGS. 1, 2 where the parts described for FIGS. 4-6 are identical.

The generally horizontally extending cylinder 35 of the feeder has its axis extending in the same direction as the axes of rollers 11, 12 except that it is inclined slightly so that the pears will roll down the inside of the cylinder and out of the lower discharge end. Said cylinder 35 is in a vertical plane bisecting the space between rollers 11, 12 and the table or platform 36 for the discharged pears is between the discharge end of the cylinder 35 and the receiving ends of the rollers.

The cylinder 35 is rotated by a source of power connected with a gear 40 that, in turn, has its teeth in mesh with the links of a sprocket chain 41 secured around said cylinder 35 (FIGS. 3, 5).

The walls 37 may be stationary while the platform 36, which has a V-shaped upper surface to center the pears thereon, is tiltable about pivot 39 from a horizontal pear receiving position, to a slanted position for rolling the pear on the table toward the rollers 11, 12. However, a gate between the table and the rollers will prevent the pear on the table from rolling off the latter, until the gate is opened.

In FIG. 6 said gate is shown as comprising a pair of vertically extending elements 42, 43, and these same elements form the gate 38 of FIG. 3. However, one of the elements, such as element 43 (FIG. 6) carries the pear turning or reversing member 44, that is the same as the device 19 of FIGS. 1, 2, except that the gate element 43 supports the device 44 on the same position as device 19 of FIGS. 1, 2 with respect to the rollers 11, 12.

A cam 45 on shaft 46 that carries the gear 40 of the feeder (FIG. 3) engages a follower 46 for intermittently tilting the table 36. This follower is secured to table 36 and rigid therewith is a projection 47 that extends between the gate members 42, 43 at their lower ends (FIGS. 3, 6). Said gate members are pivotally connected to the feeder frame 48 by horizontal pivots 49 (FIG. 6) for swinging apart of the upper ends of the gate members 42, 43.

Cam pieces 51 on gate members or arms 42, 43 just above pivots 49 have similarly formed opposed cam surfaces that are engaged by projection 47 when the latter is swung downwardly with the titling of table 36, to thereby swing the upper pear retaining portions of the gate apart so that the pear on table 36 will roll onto the feed end of rollers 11, 12.

The pear reversing device 44 on arm 42 will, of course, swing with the gate arm or member 42, but since the pear previously deposited on the rollers will have been reversed by engagement therewith, if its stem end was facing the wrong direction before the device 44 has swung away from the position shown in FIG. 5, there will be no interference between pears fed onto the rollers.

As a practical matter, the rollers 11, 12 may be considerably shortened, as shown in FIG. 13 where the pears are intermittently fed onto the rollers. In FIG. 13 the rollers 52, 53 are the same as rollers 11, 12 except that they are shorter. The other elements may be the same as shown in FIGS. 1-3 if a side feeder is a the end, hence there is no need to duplicate such elements.

If, for example, referring to FIG. 13 pears are fed onto the receiving ends of any of the rollers, one at a time with an interval between, and the pear has its stem end directed toward the receiving ends of the rollers, immediately upon the pear reversing device swinging back to the position of FIG. 5, it will engage the pear and the latter will reverse its direction and move toward the discharge end of the rollers before the gate opens to discharge another pear onto the rollers.

If the pears are anywhere near correctly positioned upon the rollers, they will quickly assume the position shown in FIG. 13 and will move toward the discharge end of the rollers.

Any number of sets of rollers can be used to meet the capacity of the peelers, corers, etc., that may work in conjunction with the orienters.

While it is preferable that both rollers 11, 12 are rotated, as described, it will be seen that a similar result could be obtained, were roller 12 stationary and provided with a smooth, antifriction surface, such as Teflon, since the helical path traversed by the roller engaging points on the surface of the pear would cause the pear to advance in a straight path with the stem end leading. With a pair of rollers, as shown, there is no substantial frictional resistance between each roller and the surface of a pear. In either instance the pear reversing feature would be operable.

From the foregoing description it will be apparent that the apparatus shown constitutes a feeder as well as an orienter, since the pears are discharged therefrom, one at a time, and if the pears were fed onto rollers 11, 12 at a point centrally between their ends, with opposite ends corresponding to the discharge end, then pears would be discharged from opposite ends of the rollers in oriented positions, since their smaller diameter ends would always be leading the bodies at the point of discharge. Of course such an arrangement would eliminate the reversing device for reversing the pears, and a side feed, such as shown in FIGS. 1, 2, would be adopted.

The foregoing explanation makes it apparent that modifications can be made in the preferred form of the invention without completely sacrificing the utility of the invention.

As a feeder, and as an orienter, independently of apparatus, a pear is moved in a straight, horizontal path of travel with the stem end leading the blossom end, and the method of doing this is by supporting and confining the pear to said path for rotation with its axis of rotation disposed at an acute angle relative to said path on a surface that is parallel with said path and offset to one side of and below the latter, and which surface is movable in a generally upward direction at its point of engagement with the outer surface of said pear.

We claim:
1. A pear orienting machine comprising:
 (a) a pair of horizontal elongated rollers supported for rotation about horizontal axes disposed substantially in a horizontal plane and horizontally spaced apart a distance less than the diameter of the stem end portions of the pears to be oriented;
 (b) means so supporting said rollers for rotation;
 (c) means connected with said rollers for rotating them in the same direction so that the surface on one roller of said pair adjacent to the other roller will move upwardly and away from the surface on the other roller that is adjacent thereto while said latter surface will move downwardly, whereby pears deposited on said rollers will automatically position themselves on said rollers with their stem ends facing generally toward one or the other end of said one roller and will advance along said rollers with their stem ends leading;

(d) said one roller having a friction outer surface adapted to resist slippage of a pear supported thereon;

(e) a pear turning device adjacent to one of the corresponding ends of said pair of rollers;

(f) means supporting said pear turning device spaced above said rollers in a pear turning position adapted to engage a pear advancing on said rollers toward said one of the corresponding ends of said rollers and to guide the stem end upwardly and to a reverse position directed toward the other of the corresponding ends of said pair of rollers, whereby all pears positioned on said rollers will move to said other of said ends;

(g) feed means at said one of the corresponding ends of said rollers for feeding pears onto said rollers in single file at said one of said corresponding ends;

(h) said feed means including a conveyor in longitudinal extension of said rollers for conducting pears in single file longitudinally thereof to said one of the corresponding ends of said rollers;

(i) means supporting said pear turning means for intermittent movement to and from said pear turning position to permit passage of pears therepast from said feed means;

(j) means connected with said pear turning device for so intermittently moving it.

2. In a construction as defined in claim 1, (k) said pear turning device including a gate member disposed intermediate said conveyor and said corresponding ends of said rollers for obstructing passage of pears from said conveyor onto said corresponding ends of said rollers;

(l) said member being connected with said pear turning device for movement therewith and from pear obstructing position in which said pear turning device is in pear turning position to open position permitting passage of a pear therepast when said pear turning device is moved out of said pear turning position, and vice versa.

References Cited in the file of this patent

UNITED STATES PATENTS

| | | |
|---|---|---|
| 1,902,244 | King | Mar. 21, 1933 |
| 3,040,868 | Waters | June 26, 1962 |

FOREIGN PATENTS

| | | |
|---|---|---|
| 434,861 | Great Britain | Sept. 10, 1935 |
| 1,177,021 | France | Dec. 1, 1958 |